Patented Sept. 20, 1927.

1,642,880

UNITED STATES PATENT OFFICE.

HEINRICH KRIEGSHEIM, OF NEW YORK, AND WILLIAM VAUGHAN, OF BROOKLYN, NEW YORK, ASSIGNORS TO THE PERMUTIT COMPANY, OF NEW YORK, N. Y., A CORPORATION OF DELAWARE.

MANUFACTURE OF PRECIPITATED ZEOLITES.

No Drawing.  Application filed August 17, 1925.  Serial No. 50,846.

This invention relates to the manufacture of zeolites; and it comprises a process of making zeolites of high exchange power and of quick action coupled with low apparent specific gravity, that is, of relatively large volume in comparison with the weight wherein a dilute solution of sodium silicate and one of sodium aluminate are admixed under conditions, giving mixture prior to gelatinization and a subsequent relatively slow gelatinization with production of a gel body of normal structure occupying most, but not all, the volume of the fluids mixed, the excess of mother liquor is separated from the resultant gel, the gel is partially dried, is washed and drying is thereafter completed to commercial dryness; all as more fully hereinafter set forth and as claimed.

In softening water, the use of exchange silicates or zeolites is now general; the hard water being percolated through a granular bed of silicates as long as efficient softening occurs and the bed being then revivified or regenerated by flowing salt solution through it. The salt solution is then washed out and the cycle begins anew. In all water softeners containing zeolites, this cycle occurs; but in actual operation there are many details which are important and various requirements, which are more or less conflicting, to be met. And in practice, the physical structure or nature of a zeolite preparation are as much to be considered as its sheer water softening power; and the amount of lime and magnesia which can be taken up, under favorable conditions, are not as important as the amount which will be taken up under service conditions before unsoftened water comes through; these service conditions of course varying between factory and boiler plants, where a maximum quantity of soft water in a minimum time is wanted with as short a stop for regeneration as possible, and domestic installations, where the time factor is not so interesting.

In all cases, the effective softening capacity of a given volume of the granular material is more important than that of a given weight since the size of tanks, etc., required depends on the volume. The greater the effective softening power per cubic foot, naturally the less is the size of the equipment necessary for a given amount of work. It is one object of the present invention to produce a material of high effective capacity for its volume, this effective capacity being not much affected by variations in the flow of water; and one easily and quickly regenerated.

Assuming that the softening action is a surface one, as it probably is, the total amount of hardness-giving bodies (lime and magnesia) that can be taken up before the activity of the zeolite is exhausted is proportioned to the surface. The more minutely porous the granule is the greater is the surface; but also the longer is the time taken by the water in reaching these surfaces, since to some of them it must go by diffusion. Much the same considerations apply to the regeneration step. If fine interior porosity is utilized, it takes a relatively long time for the salt solution to reach these surfaces, and, afterwards, to be removed therefrom. With very minutely porous zeolites there is a limit to the strength of salt solutions which can be directly applied since they may result in disintegration; thin interior walls between pores breaking down. Of course, the particular type of zeolite which is most desirable depends upon what result is sought; on the particular water to be treated and the particular purpose, but in a general way, the above considerations are true.

In the prior art, very many types of zeolite have been produced and found useful; various types having specific advantages for specific purposes. Most of these zeolites consist of silica, alumina, alkali and water in some form of combination. Sometimes the zeolite is made by fusing materials containing alumina, silica and soda together, with the soda in excess, giving an alkaline glass which is afterwards leached. Sometimes zeolites are made in the wet way, as by precipitating solutions containing alumina, silica and alkali, the precipitate being afterwards converted into dry granular form. It is to this latter type of material that the present invention more particularly relates, and the object of the invention is to produce a material with a certain particular type of porosity which has been found advantageous in practice.

When a solution of aluminate of soda is mixed with a solution of silicate of soda, the silica and alumina come out of solution (together with some alkali) as a gelatinous precipitate. With dilute solutions, this may be a flocky gelatinous precipitate in a body of mother liquor. This mother liquor is highly alkaline and contains soda coming both from the aluminate and from the silicate. Under proper conditions and with proper concentrations, instead of forming a gelatinous precipitate in a body of liquid, the whole liquid can be converted into a jelly; this jelly containing the mother liquor. Usually the precipitate or jelly is washed, dried and granulated; but sometimes drying precedes washing, as in Rudorf 1,304,206. In some respects, the present invention is an improvement upon this Rudorf method.

In the Rudorf process, sodium silicate is precipitated with sodium aluminate or, sometimes, with sulfate of alumina; in the latter event, the two solutions being mixed in proportions giving a certain reaction with phenolphthalein. In this Rudorf process, the gelatinous precipitate is pressed in order to free it of some of the mother liquor; the rest of the mother liquor being left in the press cake. The press cake (with included mother liquor) is dried and afterwards washed with water. On contact with the water, the press cake shatters or "decrepitates", giving a good type of granulation.

In the present invention, the solutions used are of medium concentration; the concentration and the method of mixing being so controlled as to give a relatively slow formation of a body of a gelatinous nature; this body however not occupying the whole volume. In other words, conditions are arranged that the liquid does not jelly as a whole. We desire to produce a gel body occupying most, but not all, of the original volume with some separated mother liquor.

It is important that mixing be perfected before gelatinization occurs to any substantial extent so as not to injure development of the natural structure of the gel body. The mother liquor separating from the gel or jelly is removed but the material is not pressed to separate further amounts as is done in the Rudorf process. In the usual course of operation, after admixing the required solutions together, the mixture which is still liquid is run into suitable shallow pans or troughs where it is allowed to gelatinize and where the excess mother liquor is drained off after the gel body is formed. The drained unwashed material usually runs about 90 per cent moisture; that is, it loses about 90 per cent in weight by drying at 105° C. This moist, drained material is next partly dried at a low temperature, being allowed to remain in the pans and exposed to drying conditions at a moderate heat, usually about 50° C., until most, but not all, of the water is evaporated. In practice, the moisture content is usually reduced to about 40 to 50 per cent. With a 50 per cent moisture content at this time, about 88 per cent of the original moisture is expelled. The drying is substantial but is not complete. The dried material thus produced is next washed; washing being to the disappearance of substantial alkalinity in the wash waters. Washing may be in any suitable apparatus adapted to give good washing without too much agitation. Afterwards, it is again dried at about the same temperature until there is no further loss in water. This second drying may be in any ordinary type of drying apparatus, such as tray driers. It is then once more washed and screened to the desired size.

Working with solutions of medium concentration, say around 3° to 5° Baumé, mixing can be effected in the ordinary way before gelatinization sets in. With somewhat stronger solutions less time is afforded and special expedients looking toward quick mixing become convenient. One such way is to spray the two solutions together through suitable spray nozzles.

In a specific embodiment of our invention using ordinary commercial water glass having a ratio of $SiO_2$ to $Na_2O$ of about 3:1, we usually employ the water glass as a solution not stronger than about 5° Baumé. A 3° Baumé solution is generally employed. To this we add a solution of commercial sodium aluminate of about the same concentration. As in the case of the water glass solution, we do not generally employ sodium aluminate solution of a strength greater than 5° Baumé and we prefer a 3° Baumé solution. This solution advantageously has a ratio of $Al_2O_3$ to $Na_2O$ of about 1:1. These two solutions, if of the same Baumé, may be mixed in equal proportions, or approximately equal proportions. However, there is a tolerably wide range of variance possible in this; the range extending from 2 of the one to 1 of the other, or the reverse. The best ratio we have found with 3° Baumé solutions is 5 parts by volume of silicate solution to 6 parts by volume of aluminate solution. Sometimes it is advantageous, in producing specific types of material, to add a little salt solution to one or other component of the mixture, the purpose being to utilize the "salting out" properties of the sodium chlorid. Where this is done, usually we employ a 5° to 3° Baumé solution of sodium chlorid which is generally added to, or used in making, the sodium silicate solution; usually not in excess of about ⅕ part of salt solution to 1 part of sodium silicate solution.

The way in which the two solutions are mixed is important. Using ordinary mixing devices of the tub and paddle type, it gives better results to add the aluminate solution to the silicate solution as a thin stream with constant agitation. As soon as admixture is completed and before precipitate separates, the liquid mixture is drawn off into shallow pans and allowed to stand till a gel forms. The mother liquor is drawn off and the cakes of gel which usually run about 90 per cent moisture are dried at a low temperature, usually around 50° C. until a test shows a water content between 40 and 50 per cent. The more or less fragmentary material resulting from this drying operation is washed, washing usually being carried until the alkalinity in the wash water appears negligible. Usually the material is simply washed by a flowing current of water using a rather large total volume in washing. After washing the material is sent back to the drier and drying continued at about the same temperature until the material is substantially dry. It may be again washed and once more dried; or this second washing and drying may be omitted. It is then ready for packaging or use after comminuting and screening to the size desired.

The final dried product obtained in the way described is hard and rigid, resisting mechanical wear in the softener very well. It is intimately porous, but a large proportion of the pores are macroscopic rather than microscopic; and it is therefore well adapted for quick action in the softener. The character of pore wall also allows it to withstand the action of strong salt solutions in regeneration; which is an important advantage. Regeneration can be accomplished rapidly with relatively strong brine solutions. The exchange capacity is high and the zeolite is quick-acting; a large proportion of the active surface being represented by areas to which water and salt solution can gain quick access; that is, without waiting for diffusion which is a tolerably slow action.

In making the material, we produce a slow and controlled gelatinization, so that the gel body produced has time to develop a natural structure. To this we attribute much of the hardness and rigidity of the finished material. Agitation is not continued after admixture is perfected and the natural structure of the gel body is therefore not broken up. The high exchange value and the quick action we attribute to the porous structure given by the double drying operation with the intermediate leaching.

While we have spoken more particularly of sodium aluminate and sodium silicate, it will be understood that the corresponding potassium compounds may be employed. Their use gives the same type of material as the sodium compounds, with, however, some slight change in the type of porosity; a change which may, or may not, be advantageous for particular purposes. Aluminum sulfate may be employed in lieu of sodium aluminate, but is not better. In using aluminum sulfate, it is better to make it alkaline; to convert it into a solution of sodium sulfate and sodium aluminate. In so doing, the sodium sulfate has the same advantageous results in the action as the sodium chlorid previously mentioned. In fact, sodium sulfate and a wide variety of soluble salts of the alkali metals may be substituted for sodium chlorid. They have the same "salting out" action; modifying the properties of the gel body produced.

What we claim is:—

1. In the manufacture of precipitated zeolites having a large area of quick-acting surface, the process which comprises treating a sodium silicate solution with a solution of sodium aluminate in such proporations and of such concentration as to slowly develop a gel body of normal structure occupying most, but not all, of the volume of the mixed liquids, removing such liquid phase as is separated, drying the gel body in its original condition without separating contained water from the mass prior to drying, said drying being carried to such an extent as to remove most, but not all, of the water, washing and redrying.

2. In the manufacture of precipitated zeolites having a large area of quick acting surface, the process which comprises producing a gel body of normal structure by the action of a solution of sodium aluminate on a solution of sodium silicate, partly drying said body in its original condition, without separating contained water from said body prior to drying, washing and drying.

3. In the manufacture of precipitated zeolites having a large area of quick acting surface, the process which comprises producing a gel body of normal structure by the action of a solution of sodium aluminate and a solution of sodium silicate in the presence of dissolved sodium chlorid, partly drying said mass in its original condition without separating contained water from said mass prior to drying, washing and redrying.

In testimony whereof we have hereunto affixed our signatures at New York city, N. Y., this 16th day of October, 1925.

HEINRICH KRIEGSHEIM.
WILLIAM VAUGHAN.